Sept. 2, 1958 A. H. DICKINSON 2,850,235
AUTOMATICALLY RESET REGISTER
Filed Sept. 23, 1954 3 Sheets-Sheet 2

INVENTOR.
A. H. DICKINSON
BY
AGENT

Sept. 2, 1958  A. H. DICKINSON  2,850,235
AUTOMATICALLY RESET REGISTER
Filed Sept. 23, 1954  3 Sheets-Sheet 3

INVENTOR.
A. H. DICKINSON
BY
James A. Ruth
AGENT

United States Patent Office 2,850,235
Patented Sept. 2, 1958

2,850,235

AUTOMATICALLY RESET REGISTER

Arthur H. Dickinson, Greenwich, Conn., assignor to International Business Machines Corporation, New York, N. Y., a corporation of New York Application September 23, 1954, Serial No. 457,873

14 Claims. (Cl. 235—61)

The present invention relates to accumulators in general and in particular to an electronic register capable of zeroizing a previously entered value concurrently with the receipt of other values to be entered therein.

It has been the common practice in the prior art of registers and accumulators that certain times in each cycle of operation of an accumulator are assigned for its different functions. These functions generally are the "reset," the "read-in," and the "read-out" operations. The accumulator of the present invention is distinguished by the fact that resetting and entering operations are concurrently effected. In this manner, the speed of operation of the device is increased and also the Control Circuits and the Program Circuits for the accumulator are simplified.

It is the general object of this invention to provide novel means for resetting an accumulator concurrently upon the effecting of an entry therein.

It is an object of the invention to provide novel means for resetting a register upon receipt of entries which are effected by sequentially timed impulses.

It is also an object of the invention to provide novel means for resetting a register upon the receipt of entries which are effected by concurrently applied impulses.

Another object of the invention is to provide novel means for zeroizing a register upon receipt of any differentially timed impulse representative of a digit to be entered into the register.

Another feature of the invention is the provision of novel means for zeroizing all stages of a register except those operated in response to entries.

Still another feature of the invention resides in the provision of novel means for operating an entry control device for dually controlling the reset of its associated denominational order and for the causing of entries to be made therein.

Still another object of the invention resides in the provision of novel means for maintenance of an electronic trigger in its status quo upon the receipt of signals, including those tending to effect a change in its status quo.

Another feature of the invention resides in the provision of novel means for recognizing one or a plurality of signals for effecting or maintaining the status quo of elements of an accumulator and for causing a reversal in the status quo of certain elements during times of non-receipt of signals.

Other objects of the invention will be pointed out in the following description and claims and illustrated in the accompanying drawings which disclose, by way of example, the principle of the invention and the best modes which have been contemplated of applying that principle.

In the drawings:

Fig. 4 is a timing diagram illustrative of a combined resetting and entry operation when value impulses are applied to the denominational order disclosed in Fig. 3.

*General*

It has been pointed out hereinabove that with regard to a register, accumulator, or storage device for operating upon data, that in the prior art it has become common practice that different times in the cycle of operation are assigned for the "reset," the "read-in" and the "read-out" functions. The accumulator to be subsequently described in detail is characterized by the fact that resetting and entering operations are concurrently effective.

Figure 1:
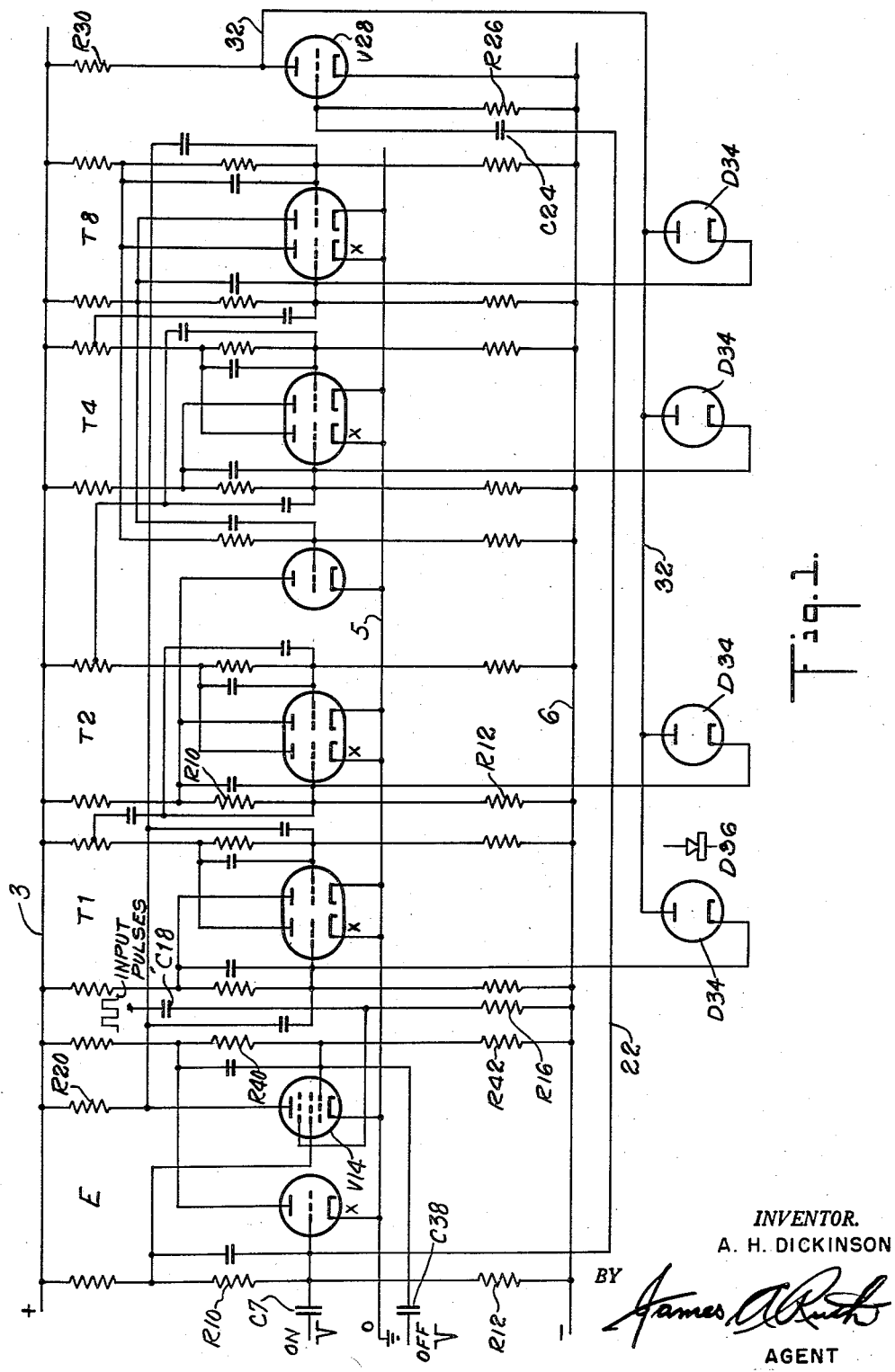
Fig. 1 is a circuit diagram of the main embodiment of the invention.

Two embodiments of the invention are shown, and these are provided with circuits which permit the resetting and the entering operations to be effective concurrently. The first form of accumulator comprises essentially in each order four trigger elements connected in cascade with the provision of blocking means for causing its natural frequency of repetition to be in the tens notation and to thereby manifest all the digits of this notation. Fig. 1 discloses a single order of such an accumulator. Associated with each order of this accumulator is an entry control element which is responsive to a differentially timed impulse. The operation of the entry control element, when rendered operative by a differentially timed impulse, is such that a number of impulses corresponding in number to the value of the timed impulse, are applied to the register.

Figure 3:
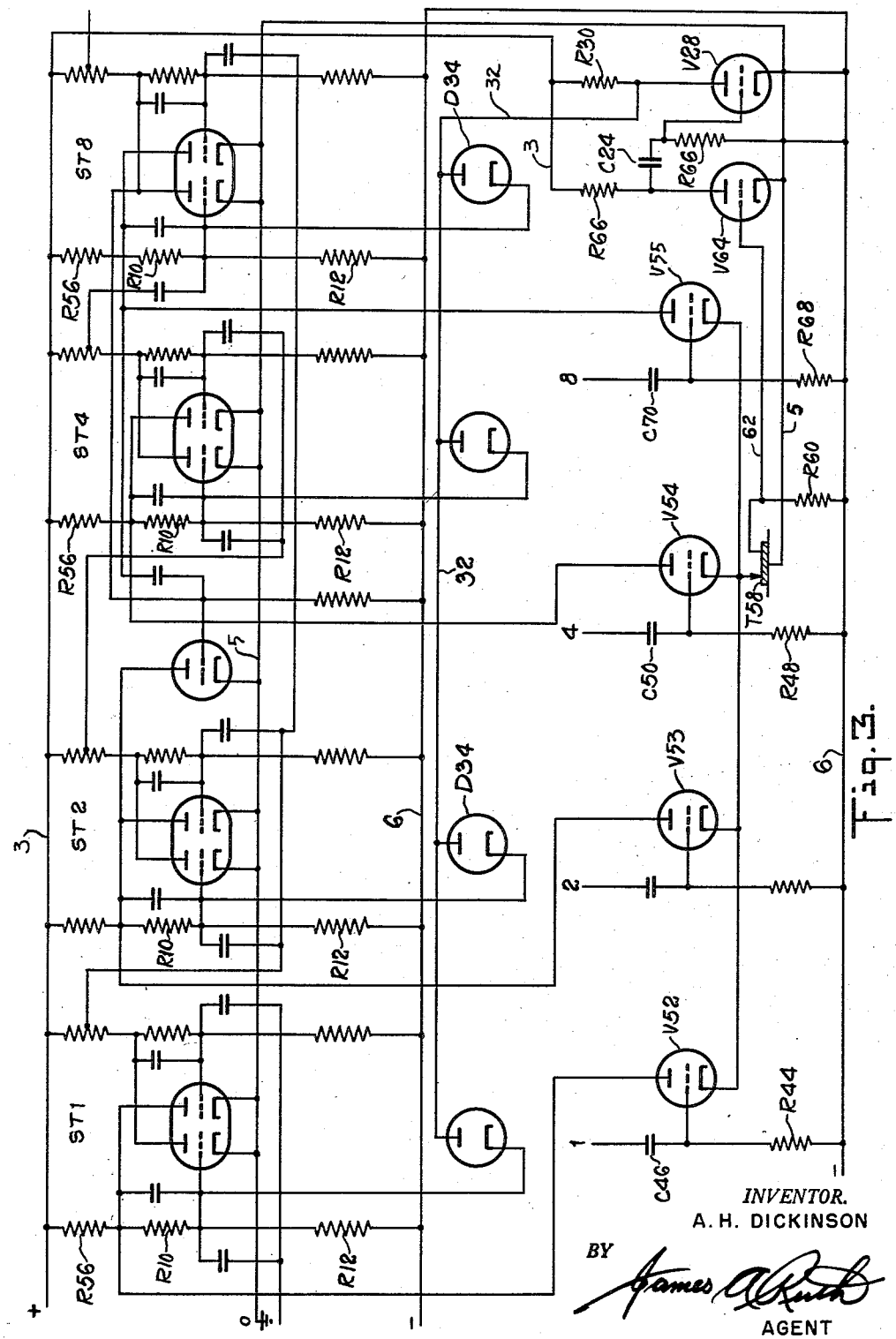
Fig. 3 is a wiring diagram of a modification of the invention.

In a modification, a register, one order of which is shown in Fig. 3, having four trigger elements and a blocking means, are combined to constitute a device which is operable to manifest the tens notation similar to that in the main embodiment disclosed in Fig. 1. However, in this modification no entry control element is provided. In lieu of employing a differentially timed impulse for effecting a read-in to the accumulator of the modification, combinationally coded impulses indicative of each value are utilized. For example, if the number to be entered is 5, it is represented by a combinational coding of impulses of 1 and 4 values. These combinational value impulses are concurrently applied to related trigger elements of the required register order.

It will be appreciated that, while the invention is disclosed in combination with an electronic counter modified to operate in binary decimal fashion, it is equally well applicable to other forms of counters.

One variant form of counter utilizes a ring of gaseous discharge tubes while another variant form of counter, having as many stages as there are digits in the notation employed, utilizes simple bi-stable devices such as either ferroelectric devices or magnetic core devices.

The invention is adaptable by those skilled in the art to counters employing a plurality of magnetic core bi-stable devices.

With regard to the main embodiment, it has been previously mentioned that the value impulses are under control of an entry control element. In accordance with the invention this element now has an additional function. The entry control element is additionally effective in response to a differentially timed impulse to operate a circuit for zeroizing its related four digit manifesting trigger circuits. The zeroizing, or resetting, operation occurs just prior to receipt by the four triggers of the value impulses provided by the entry control device.

With regard to the modification of the invention, one or a plurality of value entry pulses is effective to operate not only its associated digit registering element, but also to cause operation of a reset circuit for the purpose of zeroizing any of the trigger elements which have not received entries.

Operation

Referring now to Fig. 1, the four elements making up a register order are the triggers labeled "T–1," "T–2," "T–4" and T–8." Lines 3, 5 and 6 are wires provided for the supply of power to the accumulator order. Wire 3 supplies a high positive potential for the anode circuits of the triggers. Wire 6 provides a minus bias voltage for these triggers and other associated tubes, while wire 5 is the common or zero potential wire. The entry control element is a trigger labeled "E." Since each order of a plural order register is comprised of the same elements shown in Fig. 1, and are operated in the same manner, it is believed not to be necessary to otherwise show or mention them.

A detailed description of the operation of a single trigger, such as T–1, and the operation of a group of four triggers (T–1), connected in cascade in combination with a blocking tube for altering the normal sequential operation of the cascade chain to count in another radix is disclosed and claimed in U. S. Patent 2,584,811, granted to B. E. Phelps on February 5, 1952.

It will be noted that each trigger circuit contains a small $x$ located beneath one of the cathodes. This $x$ indicates which tube is conducting current when the trigger is considered to be in the "off" stable state.

Figure 2:
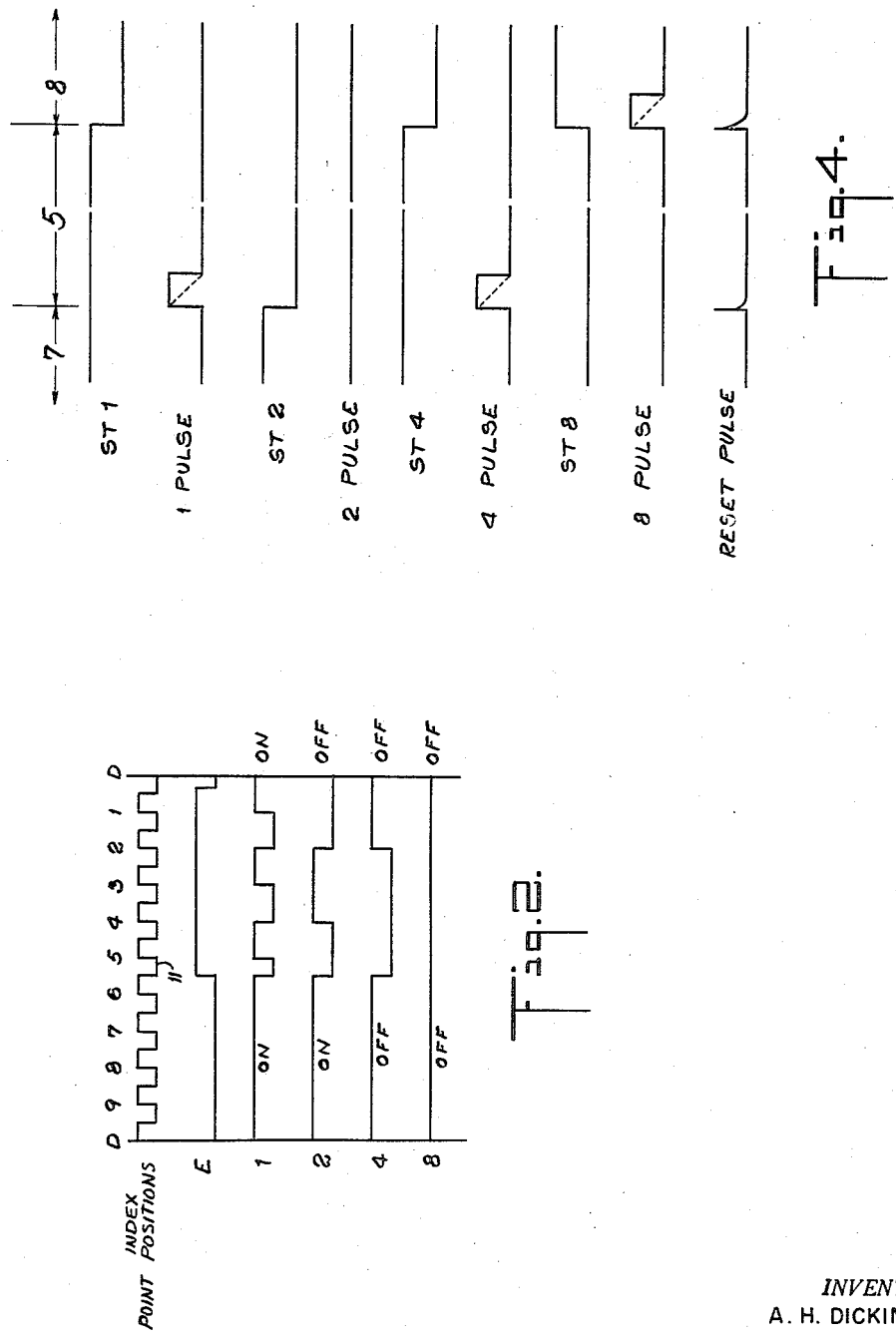
Fig. 2 is a timing diagram showing the mode of pulse timing for operating one denominational order of a combined resetting and entry operation.

The operation of the Fig. 1 circuit, according to this invention, is now discussed in detail in connection with a specific example. Reference should also be made to Fig. 2. At the beginning of a cycle of operation in which the setting of the register order is to be changed, it is assumed that T–1, T–2 and T–4 are "on," indicating that a value 7 is registered therein. It is further assumed that a value of 5 is to replace the value 7.

Fig. 2 is a timing diagram showing the sequence of value input pulses and the particular "on" and "off" stable states for each trigger for each number of value input pulses, zero through nine. The zero pulse time is indicated as "D" on the figure and each pulse position is hereafter spoken of as an index point position. It will be noted that the time from the D position on the right to the succeeding D position on the left constitutes one complete cycle of operation.

In the 5 index point position an impulse 11 is applied from a source not shown through condenser C–7 to the R–10, R–12 junction of trigger E, switching E from the "off" to the "on" status. The control grid of tube V–14 will now be at zero potential. The suppressor grid of tube V–14 continually receives impulses through condenser C–18 from a source which is not shown. With the control grid of tube V–14 now at zero potential, the control of current flow through the tube is exercised by the suppressor grid and the impulses applied to it are effective to permit anode-cathode current through tube V–14, resulting in the production of pulses across resistor R–20.

The R–10, R–12 junction of trigger E is coupled via wire 22 and consenser C–24 to one terminal of resistor R–26. The grid of tube V–28 is connected to the C–24, R–26 junction. Since both the cathode of tube V–28 and one side of resistor R–26 are returned to the same potential on line 6, tube V–28 is normally at zero bias potential.

The anode of tube V–28 is connected to line 3 via a resistor R–30. Since tube V–28 is normally zero biased, the flow of current through resistor R–30 is high and the potential of the R–30, V–28 anode junction is relatively near the potential of line 6. When trigger E is switched on in the manner previously described, the potential of the R–10, R–12 junction falls and a negative pulse is transmitted over wire 22 to the grid of tube V–28. This has the effect of momentarily shutting tube V–28 off to thereby appreciably decrease the voltage drop across resistor R–30.

Wire 32 couples the R–30, V–28 anode junction to four diodes D–34. The cathode of each diode D–34 is connected to the corresponding R–10, R–12 junction of each of the register triggers T–1, T–2, T–4 and T–8. We may mention that, in lieu of employing hot cathode diodes such as D–34, crystal diodes such as D–36, shown in outlined form, may be utilized.

It has been previously mentioned that the potential of wire 32 is normally near that of line 6. In such status, there is no current flow through any of the four diodes D–34, since the potential of wire 32 is less than that of the particular R–10, R–12 junction irrespective of the "on" or "off" status of a trigger circuit T–1, T–2, etc.

As has been described, tube V–28 is rendered nonconductive upon the turning on of trigger E. The decreased voltage drop produced across the resistor 30 causes the potential of wire 32 to rise to at least that of line 5. In the example under consideration, it is assumed that a 7 stands in the register order. This value would be manifested by the fact that triggers T–1, T–2 and T–4 are turned to their "on" status. In such status, the potential of the R–10, R–12 junction in each of the aforementioned trigger circuits is below that of line 5. The rise in potential of wire 32 causes positive pulses, occurring on wire 32 in response to the "on" pulse applied to condenser C–7, to be applied through three of the diodes D–34 to the R–10, R–12 junction of triggers T–1, T–2 and T–4. This causes these three triggers to switch from their "on" to their "off" status on receipt of the first pulse thereof. Since trigger T–8 is already "off," the pulse produced on wire 32 has no effect on this trigger.

As a result of the just described operation, all of the trigger circuits in Fig. 1 are in "off" status, and thus the register order has been zeroized (see Fig. 2). Following such resetting operating digit manifesting pulses appearing across resistor R–20 are effective to operate triggers T–1, T–2 and T–4, etc., for the remainder of the entry cycle. Since five such pulses are produced during the "on" status of E, a 5 is entered into the register order. We may mention that just before D, a pulse from a source not shown is applied through C–38 to the R–40, R–42 junction of trigger E, returning the latter to "off" status. Such a pulse may be termed an "off" pulse and may occur, preferably once each cycle. Since the control grid of V–14 is now negatively biased, the impulses applied to its suppressor grid from R–16 are ineffective to produce current flow in the V–14 anode-cathode circuit thereby suspending further pulsing of the triggers T–1, T–2, etc. In this manner the register is caused to manifest the value 5.

Referring now to Fig. 3, there is shown the wiring diagram of one order of a plural order accumulator which receives pulse entries on a combinational value basis. Since each order of this register is similar to every other one, it is believed not necessary to repeat the showing of further orders. Fig. 3 also discloses means for effecting a resetting of the digit manifesting elements, ST–1, ST–2, etc., as an entry is made therein. Portions of the Fig. 3 circuit, with functions and operation corresponding to those in the Fig. 1 circuit, are assigned similar reference characters. In the subsequent description of Fig. 3 reference should also be made to Fig. 4 which shows the timing diagram relationship occurring when a value 5 replaces an initial value 7, and a value 8 replaces the value 5 in the register.

With the 7 standing in the order, the ST–1, ST–2 and ST–4 triggers are in the "on" status. It will be remembered that in this embodiment of the invention value pulses are applied on a combinational basis; hence upon the entry of a value 5 into the register, a 1 value pulse is applied through condenser C–46 to the grid of tube V–52 and a 4 value pulse is applied through condenser C–50 to the grid of tube V–54 from a source of digit representing pulses which is not shown and is not part of the invention. The grid of the tube V–52 connects to resistor R–44 while the grid of tube V–54 connects to a resistor R–48. Normally tubes V–52 and V–54 are in a non-conductive status. The anode of tube V–52 is connected to the R–56, R–10 junction of trigger ST–1, while the anode of tube V–54 connects to the corresponding R–56, R–10 junction of trigger ST–4. The cathodes of tubes V–52, V–53 and V–55 are commonly connected to the emitter of a transistor V–58 whose base is connected to line 5. The concurrent application of a value 1 pulse and a value 4 pulse to the grid of tubes V–52 and V–54, respectively, cause these tubes to conduct. Current flow through these tubes and their load resistors R–56 and R–58, respectively, situated in triggers ST–1 and ST–4, have no effect on these triggers since they are already in "on" status.

The current flow through tubes V–52 and V–54 returns to line 5 through the emitter circuit of transistor T–58, thereby according to known principles serving to effect an increase in the emitter voltage and curent. This results in an increase in collector current and an increase voltage drop across resistor R–60 for causing the potential of wire 62 to be raised to substantially that of line 5. Tube V–64 is thus rendered conductive and produces an increased current flow through its anode resistor R–66. The negative pulse produced upon the plate of tube V–64 is differentiated by condenser C–24 and resistor R–66 before being applied to the grid of tube V–28. This negative pulse renders tube V–28 non-conductive to thereby reduce the voltage drop across its anode resistor R–30 in its plate circuit so as to allow the potential of wire 32 to rise to something near that of line 5.

Even though positive pulses are applied to the respective R–10, R–12 junctions in triggers ST–1 and ST–4, via the diodes V–34, they do not assume their "off" stable status because of the fact that current being drawn by tubes V–52 and V–54 is over-riding. The positive pulse applied to the R–10, R–12 junction in trigger ST–2, from tube V–28 through a diode D–34, is effective to switch this trigger off as indicated in Fig. 4. The pulse applied to trigger ST–8 through a diode D–34 has no effect upon this trigger since it is already in "off" status. As the time constant of the C–24, R–66 circuit is less than that of a value input circuit such as that of C–50, R–48, the reset controlling tube conducts for a relatively shorter time than does an entry tube such as V–54.

Assume, for example, that the entry following the above is that of an 8 in which case the value impulse is applied through condenser C–70 to the grid of tube V–55. The application of this pulse results in the conduction of tube V–55 and trigger ST–8, which has been previously off, is now switched on. The increased current flow through tube V–55 serves to cause the emitter current to increase and the voltage of transistor T–58, and the potential drop on R–60, also to increase. The rise in potential upon wire 62 causes tube V–64 to conduct and results in a sharp negative pulse being applied to the grid of tube X–28 shutting it off. The positive pulse now appearing on wire 32 effects the reversing of triggers ST–1 and ST–4 to their stable "off" status, but has no effect upon trigger ST–8, since the conduction of tube V–55, which causes ST–8 to switch on, is over-riding. This combined resetting and entry operation is also shown in Fig. 4.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus of the class described, the combination, comprising, an electronic accumulator having as its digit manifesting elements a plurality of dual stability triggers connected in cascade, electronic means, for altering the natural radix of counting, coacting with said accumulator triggers to produce an accumulator adapted to count in the decimal notation, means for applying trains of sequentially occurring value representing impulses on a cyclic basis, an element effective to transmit said value representing impulses when rendered responsive, means adapted to receive a cyclic initiating impulse for rendering said element responsive to the value representing impulses for transmitting these to the accumulator, and means rendered effective simultaneously with said element by the means receiving the cyclic initiating impulse for operating each digit manifesting trigger element to a predetermined one of its two conditions of stability.

2. A register comprising electronic means for electronically manifesting different digits of a notation, means for applying concurrently occurring value impulses in combination representative of the digits of a notation, electronic reset means operable to set said digit manifesting means to a zero value and means operable in response to any value representing pulse whether the same occurs singly or in combination with another value representing pulse to simultaneously render said reset means and said pulse applying means effective.

3. An adding device comprising electronic means for electronically manifesting different digits of notation, means for entering value impulses representative of a digit of a notation, electronic reset means operable to set said digit manifesting means to a zero value and means operable in response to a value representing pulse to simultaneously render said reset means and said value impulse entering means effective.

4. An adding device comprising a plurality of dual stability trigger elements connected in cascade and operable to manifest the digits of the decimal notation according to a predetermined code, value impulse operated entry control means comprising one or more electron discharge tubes having at least a cathode, a grid to which are applied value representing pulses and an anode circuit for supplying value representing pulses to said adding device, means comprising a plurality of diodes, one to a trigger for forcing said triggers to assume a predetermined stable state indicative of a zero value in response to a conductive condition in said diodes, means responsive to said value representing impulse operated entry control means for initiating conductive conditions in said diodes effective to force selected triggers to assume the said predetermined stable state.

5. A number storage register comprising settable elements controlled by concurrently occurring read-in pulses combinationally indicative of a value to be stored, means for receiving read-in pulses for operating said settable elements to combinationally manifest values of a given notation, means operable to condition said settable elements to combinationally represent a zero value and means under control of said pulse receiving means and responsive to said read-in pulses to set certain of said elements in zero value representing status simultaneously with the response of the other elements to the read-in pulses for wiping out a previously represented value concurrently with the representation of a new value.

6. In an apparatus of the class described, the combination comprising, an element settable to one or the other of two stable states, means for receiving signals of a given time duration for operating said element, first means adapted to set said element in one of its stable states in response to one of said signals, other means adapted to set said element in the other of its stable states, means responsive to said first element setting means for deriving a second signal from said signal receiving means and means for altering time duration of the derived signal for operating the other element setting means during a portion of said given time duration.

7. In an apparatus of the class described, the combination comprising, an electronic trigger device comprising a pair of tubes having their anodes and control grids cross-coupled and which is operable to either one of two sustained stable states, means for receiving signals of a given time duration for operating said trigger, electron discharge tube means having at least a control grid responsive to said signal receiving means, a cathode and an anode connected to the anode circuit of one of said pair of trigger tubes for operating the trigger to one of its stable states, a unilateral current conducting device connected to the grid circuit of the one of said pair of trigger tubes and adapted when rendered conductive to operate the trigger to the other of its stable states, semi-conductive translating means responsive to a conductive condition in said signal responsive tube means for deriving a second signal, and a pulse differentiating network responsive to the second signal for rendering said unilateral current conducting device operative to ground said trigger grid circuit during a portion of said given time duration.

8. In a register, a plurality of settable devices each having two defined states of operation, a plurality of means adapted to set said devices in one of the two states, a plurality of other means operative to restore said devices from a set state to their other state, a single means responsive to and for sensing an operated state in any one of said plurality of device setting means and means responsive to said single means for operating the plurality of restoring means simultaneously with the operation of selected ones of said plurality of setting means for setting selected ones of said devices and restoring all others of the plurality of settable devices.

9. In a register, a pair of trigger elements each having two different sustained stable states of operation, a pair of terminals for receiving trigger operating signals, a pair of trigger operating means for each trigger element, one of each pair adapted to respond to operating signals received from said terminals, semi-conductor translating means for sensing an operation of one or both of corresponding ones of the trigger operating means and pulse sharpening means responsive to an output from the translating means to produce a secondary signal for operating the others of each pair of trigger operating means, whereby one of said pair of trigger elements is either forced to maintain a predetermined stable state or caused to assume the predetermined stable state if previously operated to the other stable state.

10. In a register, a plurality of trigger elements each having two different stable states of operation, a plurality of terminals for receiving trigger operating signals, a pair of trigger operating means for each trigger, one trigger operating means for each pair comprising a grid controlled electron discharge tube, the other trigger operating means comprising a rectifier, means coupling said grid controlled tubes each to one of said pair of terminals, a common cathode circuit for said grid controlled tubes incorporating a transistor for producing a signal each time either one or a plurality of said grid controlled tubes responds to a trigger operating signal and acts to set their respective trigger in an operative stable state, pulse differentiating means for deriving a short time duration pulse from said transistor produced signal and means responsive to the differentiated pulse to render all of said rectifiers conductive for resetting any operated trigger element to its other stable state simultaneously with setting of the other triggers to their operated stable state in response to signals selectively applied to one or a plurality of terminals.

11. In an apparatus of the class described, the combination comprising, an electronic accumulator adapted to manifest the different digits of the tens notation, each digit corresponding to a number of value representing impulses, an entry control element effective to apply said value representing impulses when rendered responsive, means for receiving initiating impulses for rendering said entry control element responsive to said value representing impulses, and means controlled by said means for receiving initiating impulses and said entry control element when rendered responsive for resetting said accumulator to represent a zero value concurrently with the arrival of the first value representing impulse of a series of value representing impulses to be accumulated.

12. In an apparatus of the class described, in combination comprising, an electronic accumulator comprising a plurality of dual stability trigger elements for manifesting values of the decimal notation according to a combinational code, impulse operated means effective to enter value representations into said accumulator, means for adjusting the dual stability trigger elements to predetermined ones of their two conditions of stability to manifest a zero value representation according to said code, and means coacting with the impulse operated means effective to enter value representations for simultaneously rendering said means for adjusting said triggers to manifest zero value representations effective during a pulse of the time said means for entering value representing impulses is effective to erase one value representation from the accumulator and to manifest another in its stead.

13. In an apparatus of the class described, in combination comprising, an electronic accumulator having a plurality of trigger elements each operable to either one of two conditions of stability for manifesting value representations of the decimal notation according to a predetermined code, reset means comprising a plurality of diodes each connected to a trigger element for adjusting said trigger elements individually to a predetermined condition of stability, impulse operated value representing entry means comprising a plurality of entry control tubes, one for each trigger and each having at least a control grid, a cathode, and whose anodes are connected to each trigger for causing said triggers to manifest value representations according to said code, and means comprising a pulse translated network rendered effective by any of said entry control tubes for producing via all of said diodes impulses effective to adjust to its predetermined condition of stability any value manifested trigger not maintained operated in its other condition of stability by said entry control tubes.

14. A register comprising a plurality of bi-stable elements each operable to different ones of two conditions of stability, pulse means operable to cause said plurality of bi-stable elements to assume selected conditions of stability representative of the different digits of a chosen notation in response to the application thereto of value representing impulses, reset means operable to set all of said plurality of bi-stable elements, each to a predetermined stable condition representative of zero value in the chosen notation, and means operable in response to a value representing impulse to simultaneously render said reset means and said pulse means effective.

References Cited in the file of this patent

UNITED STATES PATENTS

| | | |
|---|---|---|
| 2,719,670 | Jacobs | Oct. 4, 1955 |
| 2,734,684 | Ross | Feb. 14, 1956 |
| 2,745,006 | Chu et al. | May 8, 1956 |

FOREIGN PATENTS

| | | |
|---|---|---|
| 1,086,430 | France | Aug. 11, 1954 |